(12) United States Patent
Mihota

(10) Patent No.: US 8,520,642 B2
(45) Date of Patent: Aug. 27, 2013

(54) WIRELESS COMMUNICATION SYSTEM, AND APPARATUS AND METHOD FOR WIRELESS COMMUNICATION

(75) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 13/097,965

(22) Filed: Apr. 29, 2011

(65) Prior Publication Data
US 2011/0205883 A1 Aug. 25, 2011

Related U.S. Application Data

(62) Division of application No. 11/974,299, filed on Oct. 12, 2007, now Pat. No. 8,000,301.

(30) Foreign Application Priority Data

Nov. 8, 2006 (JP) .................................. 2006-302792

(51) Int. Cl.
*H04W 4/00* (2009.01)
*H04B 7/02* (2006.01)

(52) U.S. Cl.
USPC .......................................... 370/334; 370/267

(58) Field of Classification Search
None
See application file for complete search history.

(56) References Cited

U.S. PATENT DOCUMENTS

| 5,559,519 A | 9/1996 | Fenner | |
|---|---|---|---|
| 8,000,301 B2 * | 8/2011 | Mihota | 370/334 |
| 2001/0046869 A1 * | 11/2001 | Cedervall et al. | 455/456 |
| 2005/0020310 A1 * | 1/2005 | Nakaya et al. | 455/562.1 |
| 2005/0094741 A1 * | 5/2005 | Kuroda | 375/267 |
| 2005/0095996 A1 * | 5/2005 | Takano | 455/91 |
| 2005/0141631 A1 * | 6/2005 | Takano | 375/267 |
| 2005/0249151 A1 * | 11/2005 | Takano | 370/328 |
| 2006/0068738 A1 * | 3/2006 | Li et al. | 455/277.1 |
| 2006/0093060 A1 * | 5/2006 | Jung et al. | 375/267 |
| 2006/0120439 A1 * | 6/2006 | Smee et al. | 375/148 |
| 2007/0217538 A1 * | 9/2007 | Waxman | 375/267 |
| 2009/0088174 A1 * | 4/2009 | Kikuchi et al. | 455/450 |

FOREIGN PATENT DOCUMENTS

JP 2005-160030 6/2005

\* cited by examiner

*Primary Examiner* — Steven H Nguyen
(74) *Attorney, Agent, or Firm* — Robert J. Depke; The Chicago Technology Law Group, LLC

(57) ABSTRACT

An embodiment of the invention provides a wireless communication system for carrying out a spatial multiplexing communication between a transmitter, and a receiver, the system including: a channel information matrix acquiring section for acquiring a channel information matrix; a weighting factor matrix arithmetically operating section for obtaining a weighting factor matrix based on the channel information matrix thus acquired; a normalizing section for executing processing for normalizing the weighting factor matrix; a detecting section for detecting whether there is presence or absence of an abnormality in the processing; a weighting processing section for executing weighting processing based on the weighting factor matrix for each of transmission signals transmitted from the transmitter in accordance with a detection result obtained from the detecting section; and a transmitting section for transmitting the transmission signals for which the weighting processing section executes the weighting processing from the transmitter to the receiver.

14 Claims, 6 Drawing Sheets

WIRELESS COMMUNICATION SYSTEM, AND APPARATUS AND METHOD FOR WIRELESS COMMUNICATION

CROSS REFERENCES TO RELATED APPLICATIONS

The subject matter of application Ser. No. 11/974,299 is incorporated herein by reference. The present application is a Divisional of U.S. application Ser. No. 11/974,299, filed Oct. 12, 2007, which claims priority to Japanese Patent Application JP 2006-302792 filed in the Japanese Patent Office on Nov. 8, 2006, the entire contents of which being incorporated herein by reference.

BACKGROUND OF THE INVENTION

1. Field of the Invention

The present invention relates to a wireless communication system with which communications are mutually made among a plurality of wireless stations as in a wireless local area network (LAN), and an apparatus and a method for a wireless communication. More particularly, the invention relates to a wireless communication system with which high speed data transmission is realized through multiplexing for a transmission line, and an apparatus and a method for wireless communication.

More specifically, the present invention relates to a wireless communication system with which high speed transmission is realized through a multiple input multiple output (MIMO) communication utilizing spatial multiplexing between a transmitter having a plurality of antennas and a receiver having a plurality of antennas, and an apparatus and a method for a wireless communication. More specifically, the invention relates to a wireless communication system with which signals are multiplexed and the multiplexed signals are transmitted without being influenced by crosstalk at all by using a singular value decomposition (SVD)-MIMO communication system utilizing the SVD of a channel information matrix H, and an apparatus and a method for a wireless communication.

2. Description of the Related Art

A wireless network attracts attention as a system for release from wirings in the traditional wired communication system. The Institute of Electrical and Electronics Engineers (IEEE) 802.11 and IEEE802.15 can be given as the standards for the wireless network.

A modulation system with which a communication speed of up to 54 Mbps is attained is supported based on the standard of IEEE802.11a/g. However, in recent years, the wireless LAN standards of the next generation with which the higher bit rate can be realized have been desired.

A multi-input multi-output (MIMO) communication attracts attention as one of the techniques for realizing the speeding up of the wireless communication. The MIMO communication is a communication system which includes a plurality of antenna elements on each of a sender side and a receiver side, and which realizes a stream obtained through spatial multiplexing. According to the MIMO communication system, a transmission capacity can be increased in correspondence to the number of antennas without increasing a frequency band, thereby attaining the increase in communication speed. In addition, utilization of the spatial multiplexing results in the excellent frequency use efficiency being obtained. The MIMO communication system is a communication system utilizing the channel characteristics, and thus is different from a simple transmitting and receiving adaptive array.

For example, IEEE802.11n as an extended standard of IEEE802.11a/g adopts an OFDM_MIMO system using an OFDM in primary modulation. Thus, the communication becomes possible at the transmission speed of 100 to 600 Mbps. An industry organization called Enhanced Wireless Consortium (EWC) which was organized on October, 2005 currently performs the development and promotion conforming to the IEEE802.11n specification with the MIMO as base.

The MIMO communication system is constructed as follows. That is to say, a channel information matrix H between a sender side and a receiver side is acquired by utilizing some kind of method. Moreover, the transmission signals spatially multiplexed in a phase of the transmission by using the channel information matrix H are spatially separated into a plurality of original streams in accordance with a predetermined algorithm.

The channel information matrix H is obtained as follows. That is to say, normally, the known training sequence is transmitted between a sender side and a receiver side through pairs of antennas. A channel transmission functions is estimated from a difference between the actually received signal and the known sequence. Also, the transmission functions for a combination of the sender side antennas and the receiver side antennas are arranged in the form of a matrix. When the number of sender side antennas is M, and the number of receiver side antennas is N, the channel information matrix becomes a matrix of N×M (row×column).

In addition, the method of spatially separating the received signals is roughly classified into two types. That is to say, one type is an open loop type in which the receiver carries out independently the spatial separation in accordance with the channel information matrix H. Also, the other type is a closed loop type in which the suitable beam formation is carried out for the receiver on the transmitter side as well by performing the sender side antenna weighting in accordance with the channel information matrix, thereby making an ideal spatial orthogonal channel. A singular value decomposition (SVD)-MIMO communication system utilizing the SVD of the channel information matrix H is known as one of the ideal forms of the closed loop type MIMO transmission.

FIG. 7 conceptually shows the SVD-MIMO communication system. In the SVD-MIMO communication system, the channel information matrix H having the channel information (transmission functions) corresponding to the pairs of antennas as elements is subjected to the singular value decomposition, thereby obtaining $UDV^H$. Also, V is given as the sender side antenna weighting factor matrix, and $U^H$ is given as the receiver side antenna weighting factor matrix. Here, a superior H represents complex conjugate transpose.

Here, D represents a diagonal matrix having square roots of eigenvalues $\lambda_i$ of a covariance matrix A of the channel information matrix H as diagonal elements (a suffix i means an i-th spatial stream). Also, the eigenvalues $\lambda_i$ correspond to qualities of the corresponding spatial streams, respectively. The singular values $\lambda_i$ are arranged in the order of decreasing the value of the diagonal element of the diagonal matrix D, and a power ratio distribution corresponding to the communication quality represented by the magnitude of the singular value, and an allocation of the modulation system are carried out for the streams. As a result, it is possible to realize a plurality of theoretically independent transmission lines for which the spatial orthogonal multiplexing is carried out. Thus, the receiver side can take out a plurality of original signal sequences without being influenced by the crosstalk at all, and the highest performance can be theoretically attained.

In the example shown in FIG. 7, the transmitter includes M transmission antennas. Thus, the transmitter distributes the transmission data to the K transmission streams, multiplexes the transmission data through the spatial/time encoding, and distributes the multiplexed transmission data to the transmission antennas, respectively, thereby transmitting the multiplexed transmission data through the respective channels. A transmission signal x' at this time is expressed in the form of a vector of M×1. On the other hand, the receiver includes the N reception antennas. Thus, the receiver subjects a received signal y' expressed in the form of a vector of N×1 to the spatial/time decoding, thereby obtaining the received data composed of the K reception streams without the crosstalk among the streams. The channel information matrix in this case is expressed in the form of a matrix H of N×M. Also, the spatial streams having only the number which is less one (MIN[M, N]) of the number of sender side antennas, and the number of receiver side antennas are ideally formed.

An element $h_{ij}$ of the channel information matrix H is the transmission function from the j-th transmission antenna to the i-th reception antenna (where i is a positive integral number of 1 to N, and j is a positive integral number of 1 to M). Also, the received signal vector y' is expressed by the following expression (1) in which a noise vector n is added to the product of the transmission signal vector and the channel information matrix.

$$y' = Hx' + n \quad (1)$$

When being subjected to the singular value decomposition in the manner as described above, the channel information matrix H is expressed by the following expression (2):

$$H = UDV^H \quad (2)$$

Here, the sender side antenna weighting factor matrix V, and the receiver side antenna weighting factor matrix $U^H$ are unitary matrices which meet the following expressions (3) and (4), respectively:

$$U^H U = I \quad (3)$$

$$V^H V = I \quad (4)$$

Where I represents a unit matrix.

That is to say, a matrix in which the normalized eigenvectors of $HH^H$ are arranged is the receiver side antenna weighting factor matrix $U^H$. Also, a matrix in which the normalized eigenvectors of $H^H H$ are arranged is the sender side antenna weighting factor matrix V. In addition, D is the diagonal matrix, and has square roots of the eigenvalues λ of $H^H H$ or $HH^H$ as the diagonal components. In other words, when smaller one of the number, M, of sender side antennas, and the number, N, of receiver side antennas is L(=min (M, N)), the diagonal matrix D becomes a square matrix of L×L as expressed by the following expression (5):

$$D = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_L} \end{bmatrix} \quad (5)$$

In the system shown in FIG. 7, the transmitter carries out the weighting transmission by using the antenna weighting factor matrix V in the phase of the transmission. On the other hand, the receiver carries out the weighting reception by using $U^H$ as the antenna weighting factor matrix in the phase of the reception. Therefore, since each of the matrices U and V is the unitary matrix (U is the matrix of N×L, and V is the matrix of M×L), the received signal y is expressed by the following expression (6):

$$\begin{aligned} y &= U^H y' \\ &= U^H (Hx' + n) \\ &= U^H (HVx + n) \\ &= U^H (UDV^H) Vx + U^H n \\ &= (U^H U) D (V^H V) x + U^H n \\ &= IDIx + U^H n \\ &= Dx + U^H n \end{aligned} \quad (6)$$

Here, the received signal y and the transmission signal x are not expressed in the form of vectors depending on the number of sender side antennas, and the number of receiver side antennas, respectively, but are expressed in the form of (L×1) vectors, respectively. The transmission signal for each stream can be received without being influenced by the crosstalk at all because D is the diagonal matrix. Also, since the diagonal elements of the matrix D become the square roots of the eigenvalues $\lambda_i$, the electric power of each of the received signals is proportional to $\lambda_i$. In addition, for the noise component n, each of the columns of U has the eigenvectors each having a norm normalized to 1. Hence, $U^H n$ changes no noise electric power. With respect to the size, $U^H n$ becomes a (L×1) vector, and y and x have the same size.

As described above, in the SVD-MIMO transmission, a plurality of independent and logical paths each of which is free from the crosstalk can be obtained in spite of the same frequency and the same time. That is to say, a plurality of data can be transmitted through the wireless communication by using the same frequency at the same time. As a result, it is possible to realize the improvement in the transmission speed.

As have been described above, the antenna weighting method in the transmitter, especially, the weighting method for the SVD-MIMO transmission (eigenmode transmission) can be expressed in the form of a mathematical expression. It is necessary for the normal actual equipment to execute the processing in real time by using an arithmetically operating circuit which is structured with the realistic circuit scale. For this reason, the integer arithmetic operation is carried out for the calculation for obtaining the weighting factor matrix from the channel information matrix H. Unlike the real number arithmetic operation, the integer arithmetic operation causes a problem such as an increase in arithmetic operation error, an overflow, an underflow or the like due to an influence of a word length limitation. As a result, there is the high possibility that the row norm of the weighting factor matrix largely varies.

On the other hand, an upper limit is generally set in the transmission output of the wireless transmitter from the Radio Law control or the like. Here, normally, the transmission is carried out with the output as large as possible in the range of not exceeding the upper limit because the transmission output is connected directly with a communication distance. In the transmitter as well which carries out the weighting transmission described above, the matrix V having the row norm normalized to 1 is used as the weighting factor matrix, thereby preventing the transmission output from fluctuating for any weighting factor matrix (that is, thereby preventing the transmission output from exceeding the upper limit).

However, in the case where the arithmetic error, the overflow or the like accompanying the integer arithmetic operation or the like as described above occurs in the process for arithmetically operating the weighting factor matrix, it is possible that the weighting factor matrix becomes the unexpected value. Thus, it is the possibility that the transmitter multiples the transmission signal by the transmission weighting factor matrix having the unexpectedly large value, so that the output of the resulting signal exceeds the upper limit of the transmission output, thereby running foul of the Radio Law control.

The technique as described above, for example, is disclosed in Japanese Patent Laid-Open No. 2005-160030.

SUMMARY OF THE INVENTION

In the light of the foregoing, it is desirable to provide an excellent wireless communication system which is capable of realizing high-speed data transmission through an MIMO communication utilizing space-division multiplexing between a transmitter having a plurality of antennas and a receiver having a plurality of antennas, and an apparatus and a method for a wireless communication.

It is also desirable to provide an excellent wireless communication system which is capable of multiplexing and transmitting signals without being influenced by the crosstalk at all by using an SVD-MIMO communication system utilizing singular value decomposition of a channel information matrix H, and an apparatus and a method for wireless communication.

It is further desirable to provide an excellent wireless communication system which is capable of realizing an improvement in a transmission speed through SVD-MIMO transmission by calculating a weighting factor matrix by using an integer arithmetically operating circuit limited in a word length in a transmitter, and an apparatus and a method for wireless communication.

It is still further desirable to provide an excellent wireless communication system which is capable of realizing an improvement in a transmission speed through SVD-MIMO transmission by reducing the possibility that a transmission electric power exceeds an upper limit through the suppression of a fluctuation in row norm of a weighting factor matrix accompanying an arithmetic operation error or an overflow when the weighting factor matrix is obtained by using an integer arithmetically operating circuit limited in a word length in a transmitter, and an apparatus and a method for wireless communication.

According to an embodiment of the present invention, there is provided a wireless communication system for carrying out a spatial multiplexing communication between a transmitter having a plurality of antennas, and a receiver having a plurality of antennas, the wireless communication system including:

channel information matrix acquiring means for acquiring a channel information matrix having transmission functions of the pairs of antennas between the sender side and the receiver side as elements;

weighting factor matrix arithmetically operating means for obtaining a weighting factor matrix based on the channel information matrix thus acquired;

normalizing means for executing processing for normalizing the weighting factor matrix;

detecting means for detecting whether there is presence or absence of an abnormality in the processing executed by the weighting factor matrix arithmetically operating means or the normalizing means;

weighting processing means for executing weighting processing based on the weighting factor matrix for each of transmission signals which are transmitted from the transmitter in accordance with a detection result obtained from the detecting means; and transmitting means for transmitting the transmission signals for which the weighting processing means executes the weighting processing from the transmitter to the receiver.

However, "the system" stated herein means one in which a plurality of apparatuses (or functional modules which realize specific functions, respectively) are logically assembled. Thus, it is especially no object whether or not the apparatuses or the functional modules are provided in a single chassis (and so forth on).

The MIMO communication is generally known as one of the techniques for realizing the speeding up of the wireless communication. Especially, according to the SVD-MIMO communication system, the channel information matrix H having the channel information corresponding to the pairs of antennas as the elements is subjected to the singular value decomposition, thereby obtaining $UDV^H$. Thus, V is given as the antenna weighting factor matrix on the sender side, and $U^H$ is given as the antenna weighting factor matrix on the receiver side. As a result, it is possible to realize a plurality of logically independent transmission lines for which the orthogonal spatial multiplexing is carried out. Also, a plurality of original signal sequences can be taken out on the receiver side without being influenced by the crosstalk at all, and thus the highest performance can be theoretically attained.

Here, the antenna weighting method for the transmitter is expressed in the form of the mathematical expression. Also, it is necessary for the normal actual equipment to execute the processing in real time by using the arithmetically operating circuit which is structured with the realistic circuit scale. For this reason, the integer arithmetic operation is carried out for the calculation for obtaining the weighting factor matrix from the channel information matrix H. Unlike the real number arithmetic operation, the integer arithmetic operation causes a problem such as an increase in arithmetic operation error, an overflow, an underflow or the like due to an influence of a word length limitation. As a result, there is the high possibility that the row norm of the weighting factor matrix largely varies. For this reason, though the matrix having the row norm normalized to 1 is used as the weighting factor matrix, the unexpectedly large weighting factor matrix is calculated due to the arithmetic operation error, the overflow or the like which is generated in the phase of calculation of the weighting factor matrix. As a result, there is the dangerousness that the output of the transmission signal exceeds the upper limit controlled by the Radio Law or the like.

Thus, in the wireless communication system according to the embodiment of the present invention, the arithmetically operating means such as the weighting factor matrix arithmetically operating means and the normalizing means are constituted by integer arithmetic operation modules, respectively. In this case, however, the normalizing means executes the processing for normalizing the weighting factor matrix in the final stage of the processing for arithmetically operating the weighting factor matrix. As a result, the influence of the arithmetic error or the overflow which is mixed into the weighting factor matrix arithmetic operation is reduced.

More specifically, the normalizing means carries out the normalization for the eigenvectors obtained from the eigenvalues of the covariance matrix of the channel information matrix in the weighting factor matrix arithmetically operating means. Or, the normalizing means carries out the normalization for the transmission signal vectors after the weighting processing based on the weighting factor matrix is executed in the weighting processing means.

When such normalizing means properly operates, the row norm of the output weighting factor matrix is usually held at a constant value. However, when the input signal to the weighting factor matrix arithmetically operating means becomes beyond the expected limit in the integer arithmetic operation, it is possible that the arithmetic operation error occurs, or the overflow or the underflow occurs in the middle of the arithmetic operation. Therefore, the proper operation is not necessarily guaranteed. In particular, there is the high possibility that the arithmetic operation error for a too large input or a too small input becomes large because the division is carried out based on the square-root of sum of squares in the normalizing processing.

Then, the detecting means detects that an input signal beyond a predetermined limit is input to the normalizing means, or that the overflow or the underflow occurs in the middle of the arithmetic operation for the normalization as an abnormality.

Also, when the detecting means detects the abnormality in the normalizing processing, the weighting processing means outputs another weighted transmission signal having the row norm guaranteed therefore instead of weighting each of the transmission signals with a weighting factor matrix arithmetically operated by the weighting factor matrix arithmetically operating means. As a result, it is possible to avoid the dangerousness that the transmission electric power exceeds the upper limit set by the Radio Law control.

For example, the wireless communication system further includes nonvolatile memory means for previously storing therein one or more weighting matrices each having the row norm guaranteed therefore, and when the detecting means detects the abnormality in the normalizing processing, the weighting processing means weights each of the transmission signals by using a weighting factor matrix stored in the nonvolatile memory means. Thereby, it is possible to avoid the dangerousness that the transmission electric power exceeds the upper limit set by the Radio Law control.

The weighting factor matrix having the row norm guaranteed therefore, for example, is a unit matrix, a rotation matrix having a suitable angle, a mirror matrix, a Walsh-Hadamard matrix, a matrix obtained by combining these tow or more matrices with each other, or the like.

In addition, the nonvolatile memory means may store therein a plurality of different weighting factor matrices, and when the detecting means detects the abnormality in the normalizing processing, the weighting processing means may suitably select optimal one from among the plurality of different weighting factor matrices stored in the nonvolatile memory means, and may weight each of the transmission signals.

More specifically, the nonvolatile memory means stores therein a plurality of rotation matrices having different angles, and when the detecting means detects the abnormality in the normalizing processing, the weighting processing means selects one having an angle nearest the weighting factor matrix before execution of the normalizing processing from among the plurality of rotation matrices stored in the nonvolatile memory means, and weights each of the transmission signals.

In addition, the weighting factor matrix arithmetically operating means can produce a plurality set of eigenvectors based on eigenvalues obtained from a covariance matrix of the channel information matrix thus acquired. Also, the weighting factor matrix arithmetically operating means may select suitable one from among the plurality set of eigenvectors, that is, a matrix having a small possibility that the arithmetic operation error finally occurs from among the plurality set of eigenvectors.

According to another embodiment of the present invention, there is provided a wireless communication system for carrying out a spatial multiplexing communication between a transmitter having a plurality of antennas, and a receiver having a plurality of antennas, the wireless communication system including:

channel information matrix acquiring means for acquiring a channel information matrix having transmission functions of the pairs of antennas between the sender side and the receiver side as elements;

weighting factor matrix arithmetically operating means for obtaining a weighting factor matrix based on the channel information matrix thus acquired;

weighting processing means for executing weighting processing based on the weighting factor matrix for transmission signals which are transmitted from the transmitter;

transmission signal normalizing means for executing processing for normalizing each of the transmission signals weighted by the weighting processing means so that each of the transmission signals from the transmitting antennas, respectively, becomes a specified value;

matrix product arithmetically operating means for multiplying each of the transmission signals which are transmitted from the transmitter by a predetermined matrix, thereby weighting each of the transmission signals;

detecting means for detecting whether there is presence or absence of an abnormality in the processing executed by the weighting processing means or the normalizing means; and transmitting means for transmitting one of the transmitting signal for which the weighting processing means executes the weighting processing, and the transmission signal obtained by the matrix product arithmetically operating means from the transmitter to the receiver in accordance with the detection result obtained from the detecting means.

In the wireless communication system according to the another embodiment of the present invention, the detecting means detects that an input signal beyond a predetermined limit is input to the transmission signal normalizing means, or that an overflow or an underflow occurs in a middle of the normalizing processing as an abnormality. In addition, the matrix product arithmetically operating means previously prepares a weighting factor matrix having a row norm guaranteed therefore, and multiplies each of the transmission signals which are transmitted from the transmitter by the weighting factor matrix, thereby weighting each of the transmission signals. In addition, when the detecting means detects the abnormality in the processing, the transmission signal obtained by the matrix product arithmetically operating means is transmitted from the transmitter to the receiver instead of the transmission signal for which the weighting processing means executes the weighting processing. As a result, the influence of the arithmetic operation error or the overflow mixed into each of the transmission signals during the normalizing processing is reduced.

According to the embodiments of the present invention, it is possible to provide the excellent wireless communication system which is capable of multiplexing signals and transmitting the multiplexed signals without being influenced by the crosstalk at all by using the SVD-MIMO communication system utilizing the singular value decomposition of the channel information matrix H, and the apparatus and method for a wireless communication.

In addition, according to the embodiments of the present invention, it is possible to provide the excellent wireless communication system which is capable of realizing the improvement in the transmission speed through the SVD-MIMO transmission by reducing the possibility that the transmission electric power exceeds the upper limit through the suppression of the fluctuation in row norm of the weighting factor matrix accompanying the arithmetic operation error or the overflow when the weighting factor matrix is obtained by using the integer arithmetically operating circuit limited in the word length in the transmitter, and the apparatus and method for a wireless communication.

Further other objects, features and advantages of the present invention will be made clear from a detailed description based on the preferred embodiments which will be described later and the accompanying drawings.

DETAILED DESCRIPTION OF THE PREFERRED EMBODIMENTS

Hereinafter, embodiments of the present invention will be described in detail with reference to the accompanying drawings.

Figure 1:
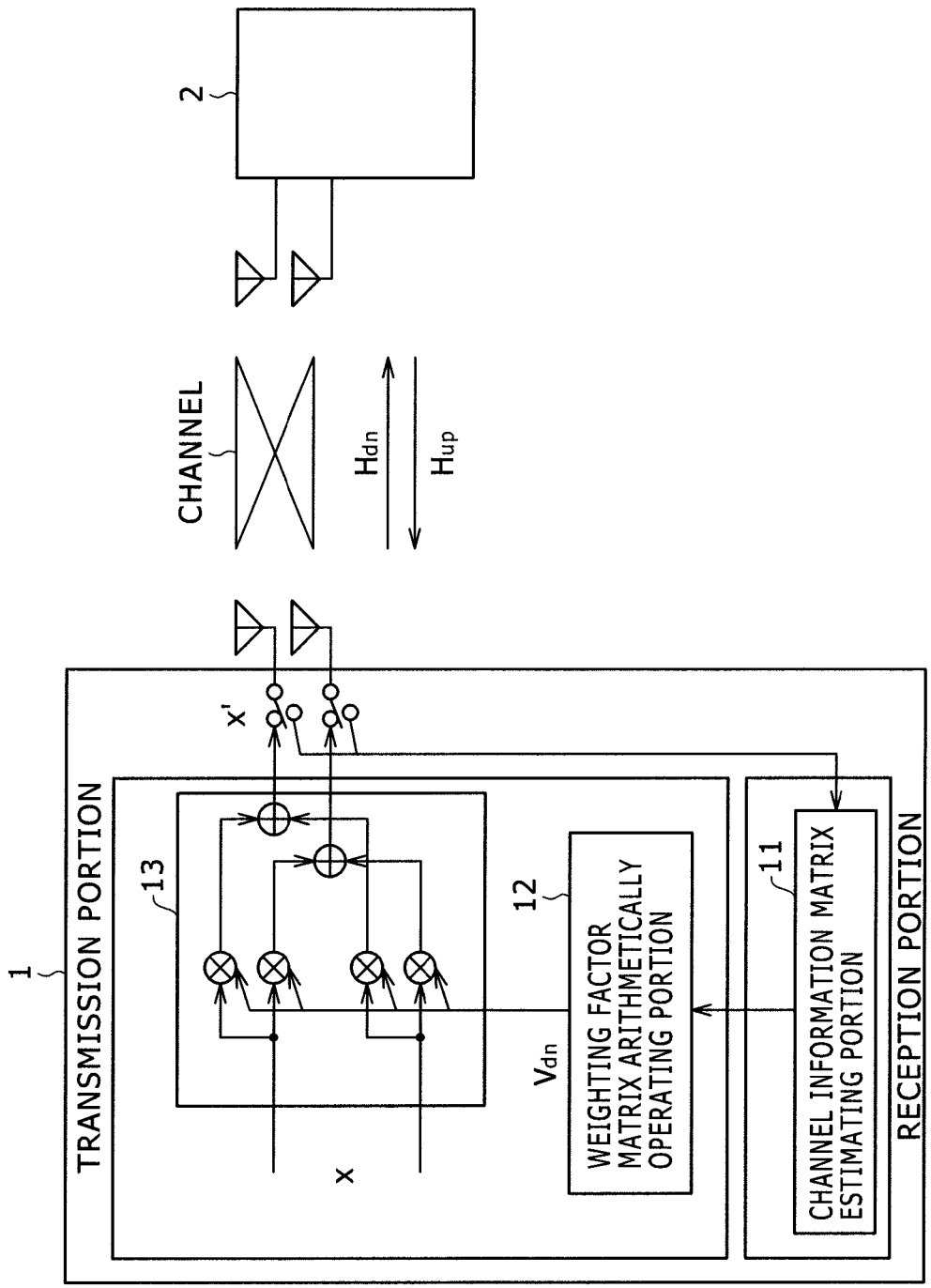
FIG. 1 is a block diagram schematically showing a configuration of a wireless communication system according to an embodiment of the present invention.

FIG. 1 schematically shows a configuration of a wireless communication system according to an embodiment of the present invention. The wireless communication system shown in the figure is composed of a terminal 1 and a terminal 2 each having two antennas, and carries out an MIMO communication utilizing space division multiplexing. Here, signal transmission from the terminal 1 to the terminal 2 is defined now as a down-direction, that is, "downlink". On the other hand, signal transmission from the terminal 2 to the terminal 1 is defined now as an up-direction, that is, "uplink".

Note that, a description will be given below by giving a single carrier communication as an example. However, of course, the present invention can be equally applied to a multi-carrier communication as well typified by an orthogonal frequency division multiplexing (OFDM) modulation system. In addition, the present invention can also be equally applied to a communication system as well having an antenna structure other than the antenna structure of 2×2 shown in the figure.

In a wireless LAN or the like, normally, a transmission line is used between communication terminals in a time division multiplexing manner. In the time division multiplexing communication, a communication in the up-direction, and a communication in the down-direction are made for approximately the same period of time. Thus, when the communication in the up-direction, and the communication in the down-direction are made at a very short interval of time as compared with a speed at which a channel fluctuates, it is possible to assume that the channel is reversible between the up-direction and the down-direction, that is, a symmetrical property of the channel. In such a case, the following expression (7) is established between a channel information matrix $H_{up}$ in the up-direction and a channel information matrix $H_{dn}$ in the down-direction:

$$H_{up}=H_{dn}{}^T \qquad (7)$$

Where a superior T represents transposition of a matrix.

When the SVD-MIMO communication is carried out from the terminal 1 toward the terminal 2, the terminal 1 needs to acquire a channel weighting factor matrix $V_{dn}$ in the downlink. A channel information matrix estimating portion 11 provided in the terminal 1, for example, obtains a transmission function for each combination of transmitting and receiving antennas, which is obtained by receiving the known training sequences sent from the antennas in a time division manner at the antennas on the terminal 1 side. Also, the channel information matrix estimating portion 11 structures these transmission functions in the form of a matrix in accordance with an arrangement of the antennas, thereby making it possible to estimate the channel information matrix $H_{up}$ in the uplink by utilizing a training period of time.

As shown in the above expression (7), the channel information matrix $H_{dn}$ in the downlink is a transposed matrix (that is, $H_{up}{}^T$) of the channel information matrix $H_{up}$ in the uplink. Also, a weighting factor matrix arithmetically operating portion 12 provided in the terminal 1 can obtain the weighting factor matrix $V_{dn}$ by further subjecting the channel information matrix $H_{dn}$ to the singular value decomposition in the manner as expressed by the following expression (8):

$$H_{dn}=U_{dn}D_{dn}V_{dn}{}^H \qquad (8)$$

The weighting factor matrix $V_{dn}$ is obtained in such a manner. Therefore, when the data transmission is carried out from the terminal 1 by utilizing the MIMO system, a weighting portion 13 complex-multiplies a transmission signal vector x which is obtained by distributing a transmission signal to the transmitting antennas by the weighting factor matrix $V_{dn}$ as shown in the following expression (9). As a result, the weighting portion 13 obtains transmission signal vectors x' through the spatial multiplexing, and transmits the resulting transmission signal vectors x' through the antennas, respectively.

$$x'=V_{dn}x \qquad (9)$$

In the above description, the MIMO communication system is constructed such that the terminal 1 side as a data transmission source calculates the weighting factor matrix $V_{dn}$ by utilizing a training signal sent from the terminal 2. However, the MIMO communication system can also be constructed by utilizing any other suitable realizing method. For example, the terminal 2 side may be provided with the same channel information estimating portion (not shown) as that of the above case. In this case, the channel information estimating portion, for example, may estimate a channel information matrix $H_{dn}$ of the downlink based on a training sequence received from the terminal 1, and may inform the terminal 1 of the resulting channel information matrix $H_{dn}$ of the downlink. Or, the terminal 2 side may be further provided with the same weighting factor matrix arithmetically operating portion as that of the above case. In this case, the weighting factor matrix arithmetically operating portion may calculate the weighting factor matrix $V_{dn}$ from the channel information matrix $H_{dn}$ and may inform the terminal 1 of the resulting weighting factor matrix $V_{dn}$. Hereinafter, a description will be given with respect to the embodiment in which the channel information estimating portion and the weighting factor matrix arithmetically operating portion are disposed in the terminal 1 becoming the sender side for the sake of convenience. However, these functional modules may also be disposed in the terminal 2 side becoming the receiver side.

Figure 2:
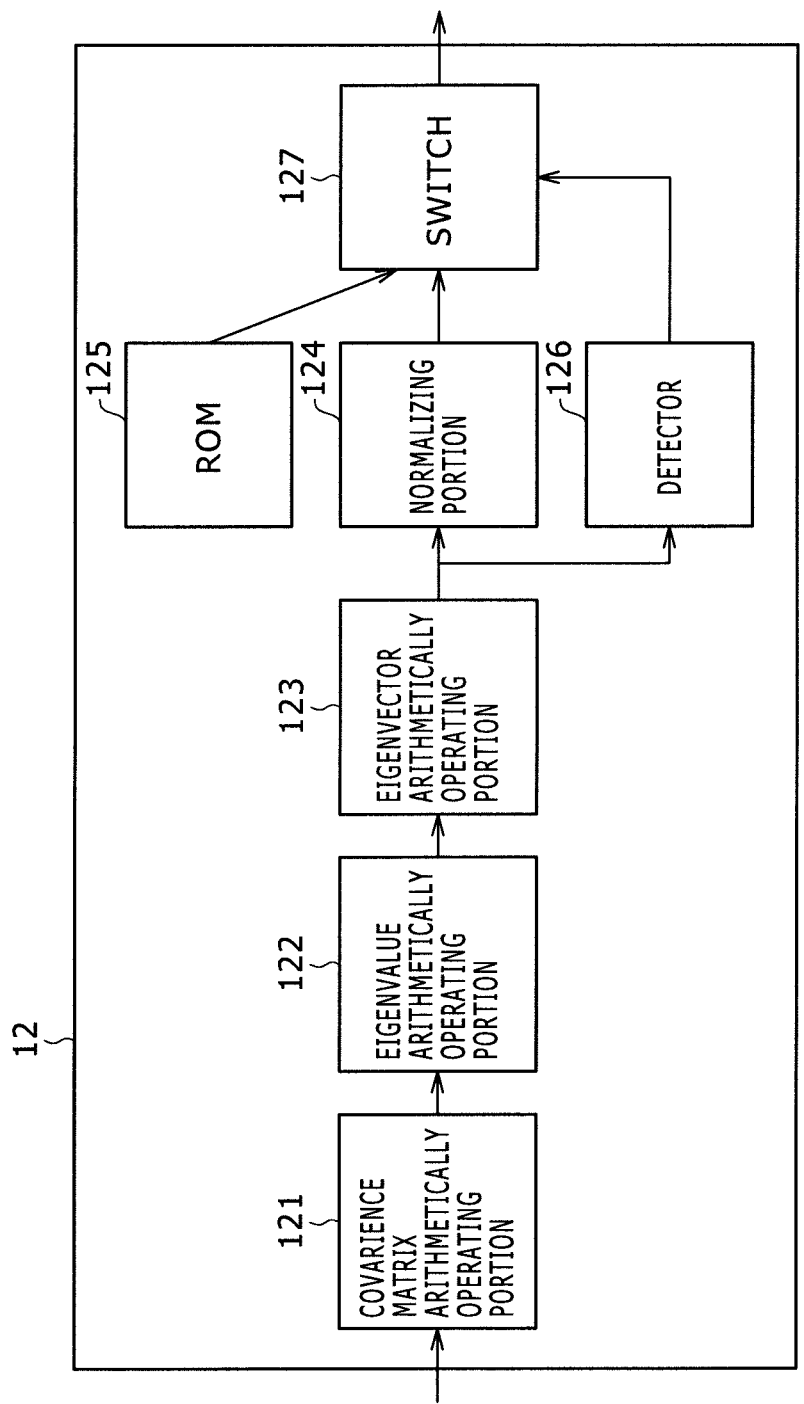
FIG. 2 is a block diagram showing a structural example of a weighting factor matrix arithmetically operating portion shown in FIG. 1.

FIG. 2 shows a structural example of the weighting factor matrix arithmetically operating portion 12 provided in the terminal 1. Here, a description will now be given with respect to a method of calculating the antenna weighting factor matrix $V_{dn}$ in the phase of the transmission in the downlink in the weighting factor matrix arithmetically operating portion 12 within the terminal 1 by giving, as an example, the case where the MIMO communication system is composed of the two transmission antennas and the two reception antennas as shown in FIG. 1.

Firstly, a covariance matrix arithmetically operating portion 121 multiples the channel information matrix $H_{dn}$ of the downlink composed of a transposed matrix of the channel information matrix $H_{up}$, of the uplink, estimated by the channel information estimating portion 11 by a complex conjugate transposed matrix $H_{dn}^H$, thereby calculating a covariance matrix A. Here, the elements of the covariance matrix A are defined as expressed by the following expression (10):

$$A = \begin{bmatrix} a_{11} & a_{12} \\ a_{21} & a_{22} \end{bmatrix} = H_{dn}^H H_{dn} \quad (10)$$

Here, when $\lambda$ is an eigenvalue of the covariance matrix A, and v is an eigenvector, relationships shown in the following expressions (11) and (12) are established:

$$Av = \lambda v$$

$$(A - \lambda I)v = 0 \quad (11)$$

$$\det(A - \lambda I) = 0 \quad (12)$$

where det represents a determination of a matrix. Also, a quadratic equation (13) which will be shown below can be obtained from the above expressions (10) and (12):

$$(a_{11}-\lambda)(a_{22}-\lambda) - a_{12}a_{21} = 0 \ \lambda^2 - (a_{11}+a_{22})\lambda + (a_{11}a_{22} - a_{12}a_{21}) = 0 \quad (13)$$

An eigenvalue arithmetically operating portion 122 solves this quadratic equation (13) to obtain eigenvalues $\lambda_1$ and $\lambda_2$ of the covariance matrix A. As previously stated, $D_{dn}$ is a diagonal matrix which has square roots of these eigenvalues $\lambda_1$ and $\lambda_2$ in a diagonal term.

Subsequently, an eigenvector arithmetically operating portion 123 substitutes these eigenvalues $\lambda_1$ and $\lambda_2$ into the above expression (11) to obtain eigenvectors. A large number of combinations exist as the eigenvectors obtained here. One of the eigenvectors is expressed by the following expression (14):

$$[v_1, v_2] = \begin{bmatrix} a_{12} & \lambda_2 - a_{22} \\ \lambda_1 - a_{11} & a_{21} \end{bmatrix} \quad (14)$$

A normalizing portion 124 normalizes this combination of the eigenvectors to obtain the weighting factor matrix $V_{dn}$. The reason for carrying out the normalization is because a matrix which is normalized so that a row norm is normalized to 1 is used as the weighting factor matrix in the weighting portion 13 in a subsequent stage, thereby preventing the transmission output from fluctuating (exceeding the upper limit) for any weighting factor matrix. The weighting factor matrix $V_{dn}$ is expressed by either the following expression (15) or (16):

$$V_{dn} = \begin{bmatrix} a_{12}/s_1 & (\lambda_2 - a_{22})/s_2 \\ (\lambda_1 - a_{11})/s_1 & a_{21}/s_2 \end{bmatrix} \quad (15)$$

where $s_1 = \sqrt{a_{12}^2 + (\lambda_1 - a_{11})^2}$, and $s_2 = \sqrt{(\lambda_2 - a_{22})^2 + a_{21}^2}$.

$$V_{dn} = \begin{bmatrix} a_{12}/t_1 & (\lambda_2 - a_{22})/t_1 \\ (\lambda_1 - a_{11})/t_2 & a_{21}/t_2 \end{bmatrix} \quad (16)$$

where $t_1 = \sqrt{a_{12}^2 + (\lambda_2 - a_{22})^2}$, and $t_2 = \sqrt{(\lambda_1 - a_{11})^2 + a_{21}^2}$.

The weighting portion 13 in the subsequent stage weights each of the transmission signal vectors x based on the weighting factor matrix $V_{dn}$ stated above.

An integer arithmetic operation is carried out on the actual equipment from the necessity for executing real-time processing for calculation of the antenna weighting factor matrix $V_{dn}$ as described above by using an arithmetic operation circuit which is structured in realistic circuit scale. Unlike the actual number arithmetic operation, the integer arithmetic operation causes the increase in arithmetic operation error, the overflow or the underflow due to the influence of the limitation in the word length. This leads to that there is the high possibility that the row norm of the weighting factor matrix $V_{dn}$ largely fluctuates. As a result, there is the dangerousness that the weighting factor matrix provides the unexpected value, and thus the transmission output exceeds the upper limit controlled by the Radio Law in the terminal 1.

On the other hand, in this embodiment, as shown in FIG. 2, the normalization is carried out in the final stage in the weighting factor matrix arithmetically operating portion 12. Thereby, the fluctuation in the row norm of the weighting factor matrix $V_{dn}$ is effectively suppressed. If the arithmetic operation error or the like is mixed into the transmission signals in the arithmetic operation before the normalization, the row norm of the output weighting factor matrix $V_{dn}$ gets usually a constant value as long as the normalizing portion 124 properly carries out the normalizing operation.

The following method, for example, can be given as an alternative of the method of normalizing the weighting factor matrix $V_{dn}$ in the final stage in the weighting factor matrix arithmetic operating portion 12 as described above. That is to say, the singular value decomposition can be carried out for the channel information matrix $H_{UP}$ of the uplink ($H_{UP} = U_{UP} D_{UP} V_{UP}^H$) to obtain and $D_{UP}$ and $V_{UP}$ similarly to the above case ($V_{UP}$ is normalized in the final stage). Also, the transmitting antenna weighting factor matrix $V_{dn}$ in the phase of the downlink can be obtained from a relationship represented by the following expression (17):

$$V_{dn} = U_{UP}^* = (H_{UP} V_{UP} D_{up}^{-1})^* \quad (17)$$

where * represents the complex conjugate, and $^{-1}$ represents an inverse matrix.

In this case, the arithmetic operation is further carried out after completion of the normalization, which increases the possibility that the fluctuation of the row norm of the transmitting antenna weighting factor matrix $V_{dn}$ occurs due to the arithmetic operation error.

Consequently, as shown in FIG. 2, the weighting factor arithmetically operating portion 12 normalizes the weighting factor matrix $V_{dn}$ in the final stage therein, thereby making it possible to suppress the fluctuation in row norm of the output weighting factor matrix $V_{dn}$.

Until now, the description has been given on the assumption that the row norm of the output weighting factor matrix $V_{dn}$ is usually held at the constant value as long as the normalizing portion 124 properly carries out the normalizing operation. However, the proper operation of the weighting factor arithmetically operating portion 12 is not necessarily guaranteed in the integer arithmetic operation limited in the word length. For example, in the case where the input signal to the weighting factor matrix arithmetically operating portion 12 exceeds the unexpected limit, it is possible that the arithmetic operation error occurs, or the overflow or the underflow occurs in the middle of the arithmetic operation. In particular, the normalizing portion 124 in the final stage of the weighting factor matrix arithmetically operating portion 12 carries out the division based on the square-root of sum of squares (refer to the above expressions (15) and (16)). As a result, there is the high possibility that the arithmetic operation error for the too large input or the too small input becomes large.

From the above, in this embodiment, in order to cope with such a problem as well, the weighting factor matrix arithmetically operating portion 12 includes a detector 126 for detecting occurrence of abnormal situations which will be described below:

(1) The input signal to the normalizing portion 124 is beyond the expected limit (too large or too small).

(2) The overflow or the underflow occurs in the middle of the arithmetic operation for normalization.

When the detector 126 detects these situations, the row norm of the output weighting factor matrix is largely different from the expected value. As a result, there is the high possibility that the transmission electric power becomes beyond the upper limit set by the Radio Law control. For this reason, a default weighting factor matrix which is previously stored in a read only memory (ROM) 125 is output to the weighting portion 13 in the subsequent stage through a switch 127 instead of the arithmetic operation result obtained from the normalizing portion 124 in accordance with a detection output from the detector 126.

Here, the normalized weighting factor matrix is prepared in the ROM 125, so that the row norm gets the expected value. In addition, the unit matrix, the rotation matrix having the suitable angle, the mirror matrix, the Walsh-Hadamard matrix, the matrix obtained by combining these two or more matrices with each other or the like, for example, can be used as the weighting factor matrix previously stored in the ROM 125.

In addition, a plurality of different weighting factor matrices may be prepared in the ROM 125. In this case, when the detector 126 detects the abnormality in the processing based on the input signal to the normalizing portion 124, the result in the arithmetic operation or the like, the weighting factor matrix arithmetically operating portion 12 may suitably select one, which is expected to be most suitable, from among the plurality of different weighting factor matrices prepared in the ROM 125. Also, the weighting factor matrix arithmetically operating portion 12 may output the weighting factor matrix thus selected instead of the result of the arithmetic operation carried out in the normalizing portion 124. For example, a plurality of rotation matrices having the respective angles may be previously prepared in the ROM 125. In this case, the weighting factor matrix arithmetically operating portion 12 may select one having the angle nearest the weighting factor matrix before the normalization is carried out from among the plurality of rotation matrices having the respective angles.

Figure 3:
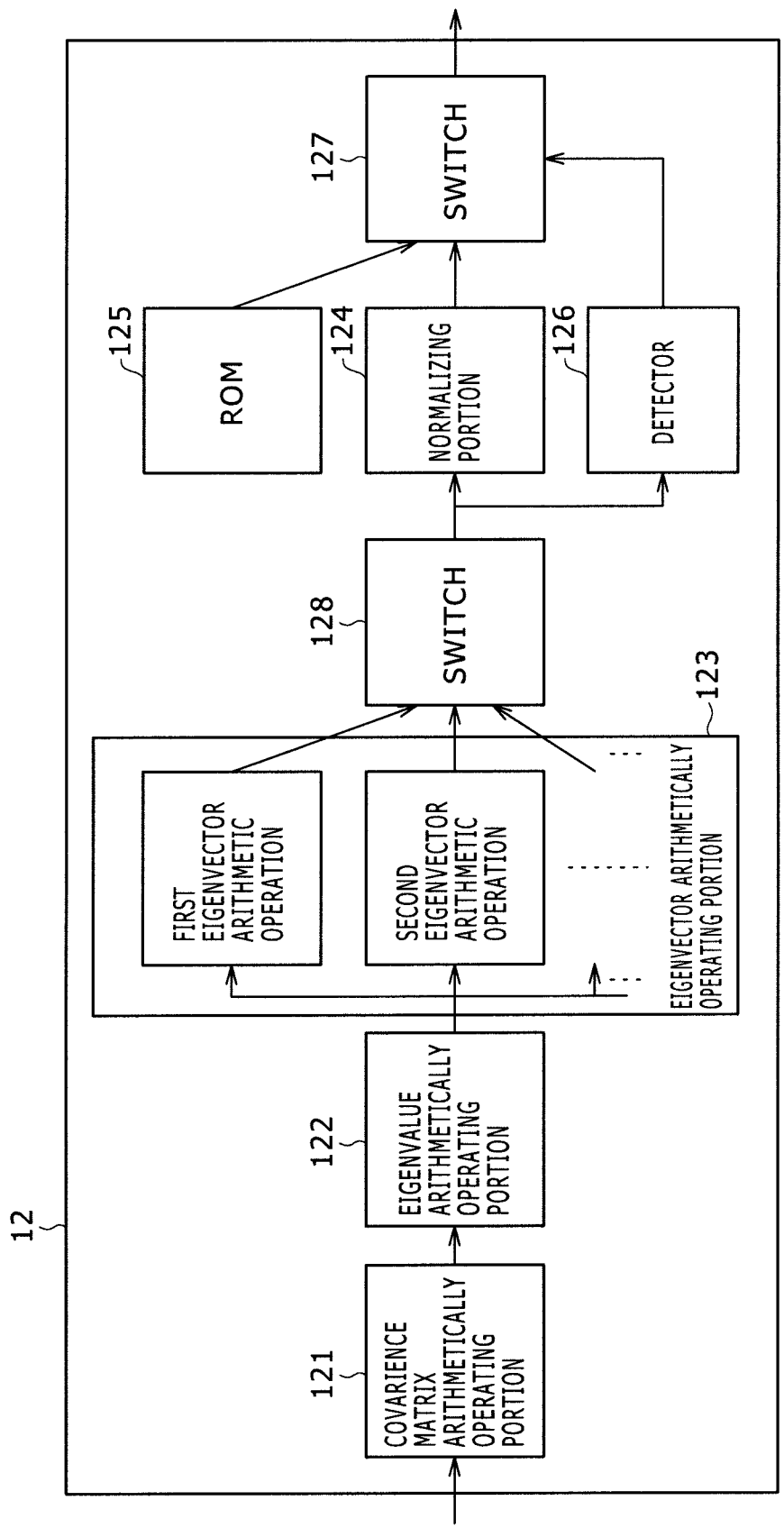
FIG. 3 is a block diagram showing another structural example of the weighting factor matrix arithmetically operating portion shown in FIG. 1.

FIG. 3 shows another structural example of the weighting factor matrix arithmetically operating portion 12. It is as previously described that when the eigenvalues $\lambda_1$ and $\lambda_2$ calculated by the eigenvalue arithmetically operating portion 122 are substituted into the above expression (11), a large number of combinations exist in terms of the eigenvector. In the another structural example of the weighting factor matrix arithmetically operating portion 12 shown in FIG. 3, the eigenvector arithmetically operating portion 123 produces a plurality set of eigenvectors obtained by arithmetically operating the eigenvalues $\lambda_1$ and $\lambda_2$. Also, the eigenvector arithmetically operating portion 123 selects suitable one from among the plurality set of eigenvectors through a switch 128, and outputs the set of eigenvectors thus selected to the subsequent normalizing portion 124.

"The matrix having the low possibility that the arithmetic operation error finally occurs", for example, can be given as the selection criteria in accordance with which the suitable one is selected from among a plurality set of eigenvectors through the switch 128.

Although the above expression (14) has already been given as one of the expressions each representing the eigenvectors, the following expression (18) is also given as one of the expressions each representing the eigenvectors:

$$[v_1, v_2] = \begin{bmatrix} \lambda_1 - a_{22} & a_{12} \\ a_{21} & \lambda_2 - a_{11} \end{bmatrix} \quad (18)$$

When the normalizing portion 124 normalizes the eigenvectors represented by the above expression (18), the weighting factor matrix $V_{dn}$ expressed by the following expression (19) or (20) can be obtained similarly to the above case.

$$V_{dn} = \begin{bmatrix} (\lambda_1 - a_{22})/s_1 & a_{12}/s_2 \\ a_{21}/s_1 & (\lambda_2 - a_{11})/s_2 \end{bmatrix} \quad (19)$$

where $s_1 = \sqrt{(\lambda_1 - a_{22})^2 + a_{21}^2}$, and $s_2 = \sqrt{a_{12}^2 + (\lambda_2 - a_{11})^2}$.

$$V_{dn} = \begin{bmatrix} (\lambda_1 - a_{22})/t_1 & a_{12}/t_1 \\ a_{21}/t_2 & (\lambda_2 - a_{11})/t_2 \end{bmatrix} \quad (20)$$

where $t_1 = \sqrt{(\lambda_1 - a_{22})^2 + a_{12}^2}$, and $t_2 = \sqrt{a_{21}^2 + (\lambda_2 - a_{11})^2}$.

Here, let us consider such a case where the channel information matrix H is degenerated. In this case, since the eigenvalue $\lambda_2$ becomes zero, the above expressions (14) and (18) can be transformed into the following expressions (21) and (22), respectively:

$$[v_1, v_2] = \begin{bmatrix} a_{12} & -a_{22} \\ \lambda_1 - a_{11} & a_{21} \end{bmatrix} \quad (21)$$

$$[v_1, v_2] = \begin{bmatrix} \lambda_1 - a_{22} & a_{12} \\ a_{21} & -a_{11} \end{bmatrix} \quad (22)$$

At this time, in such a case where an element $a_{22}$ contained in the covariance matrix is close to zero, there is the high possibility that an element $s_2$ in the above expression (15) or an element $t_1$ in the above expression (16) becomes close to zero. When a denominator becomes close to zero, an error in an arithmetic operation of division for an integral number generally becomes large. For this reason, in this case, the possibility that the arithmetic operation finally contains therein the error becomes higher in carrying out the arithmetic operation for normalizing the weighting factor matrix $V_{dn}$ from the eigenvectors expressed by the expression (21) than in carrying out the arithmetic operation for normalizing the weighting factor matrix $V_{dn}$ from the eigenvectors expressed by the expression (22).

On the other hand, in such a case where an element $a_{11}$ contained in the covariance matrix is close to zero, there is the high possibility that an element $s_2$ in the above expression (19), or an element $t_2$ in the above expression (21) becomes close to zero. For this reason, in this case, the possibility that the arithmetic operation finally contains therein the error becomes higher in carrying out the arithmetic operation for normalizing the weighting factor matrix $V_{dn}$ from the eigenvectors expressed by the expression (22) than in carrying out the arithmetic operation for normalizing the weighting factor matrix $V_{dn}$ from the eigenvectors expressed by the expression (21).

Therefore, under such a communication environment that the channel information matrix H is degenerated, the following switching control is carried out by using the switch 128 in accordance with the selection criteria with which "the matrix having the low possibility that the arithmetic operation error finally occurs" is selected from among a plurality of eigenvectors, thereby making it possible to reduce the number of arithmetic operation errors.

(1) When $a_{11} > a_{22}$, or $a_{11} \geq a_{22}$, a set of eigenvectors expressed by the above expression (18) is selected, and is supplied to the normalizing portion 124.

(2) $a_{11} \leq a_{22}$, or $a_{11} < a_{22}$, a set of eigenvectors expressed by the above expression (14) is selected, and is supplied to the normalizing portion 124.

Figure 4:
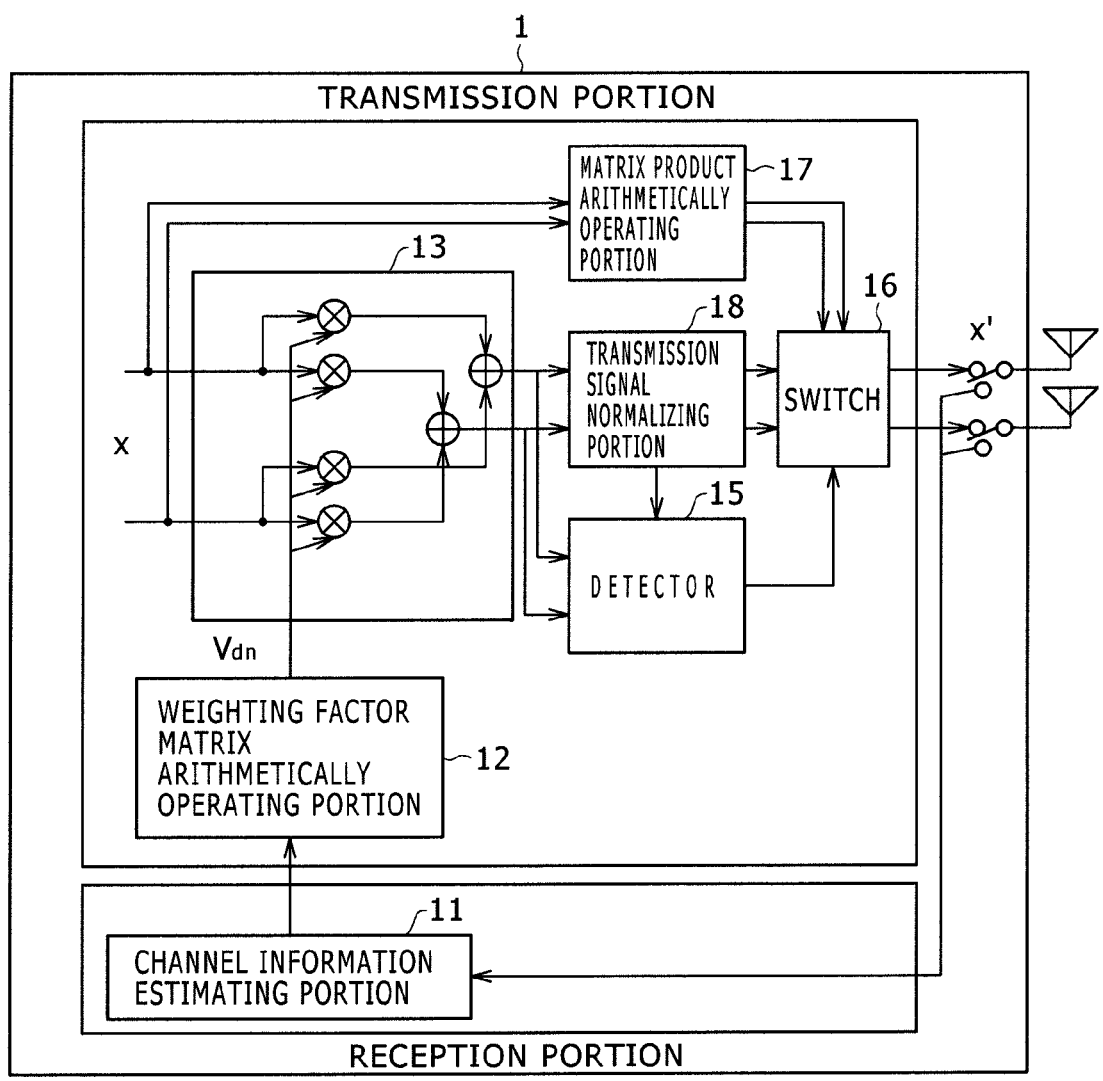
FIG. 4 is a block diagram showing a structural example of a terminal in which the weighting factor matrix arithmetically operating portion shown in FIG. 1 outputs a weighting factor matrix without carrying out normalization, and a transmission signal normalizing portion carries out the normalization for each of transmission signals weighted.

It has been described until now that the weighting factor matrix arithmetically operating portion 12 carries out the normalization. However, such a structure as shown in FIG. 4 can also be adopted. That is to say, the weighting factor matrix arithmetically operating portion 12 carries out no normalization, and outputs the weighting factor matrix. Also, the transmission signal normalizing portion 18 (disposed outside the weighting factor matrix arithmetically operating portion 12) normalizes each of the weighted transmission signals.

In the structural example of the weighting factor matrix arithmetically operating portion 12 shown in FIG. 2, the normalizing processing is executed in the final stage in the weighting factor matrix arithmetically operating portion 12. As a result, the influence of the arithmetic operation error or the overflow when the weighting factor matrix is calculated based on the integer arithmetic operation is reduced, thereby effectively suppressing the fluctuation in row norm of the weighting factor matrix $V_{dn}$. On the other hand, in the another structural example of the weighting factor matrix arithmetically operating portion 12 shown in FIG. 4, the transmission signal normalizing portion 18 executes the normalizing processing after each of the transmission signal vectors x is weighted with the eigenvectors. Likewise, the influence of the arithmetic operation error or the overflow can be reduced, thereby effectively suppressing the fluctuation in row norm of the weighting factor matrix $V_{dn}$.

Figure 5:
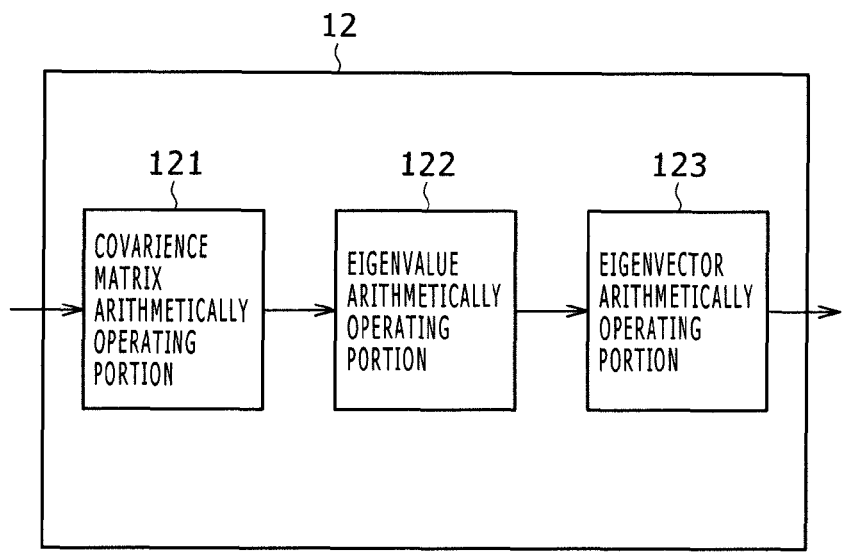
FIG. 5 is a block diagram showing an example of an internal structure of the weighting factor matrix arithmetically operating portion shown in FIG. 1 which is applied to the terminal shown in FIG. 4.
Figure 6:
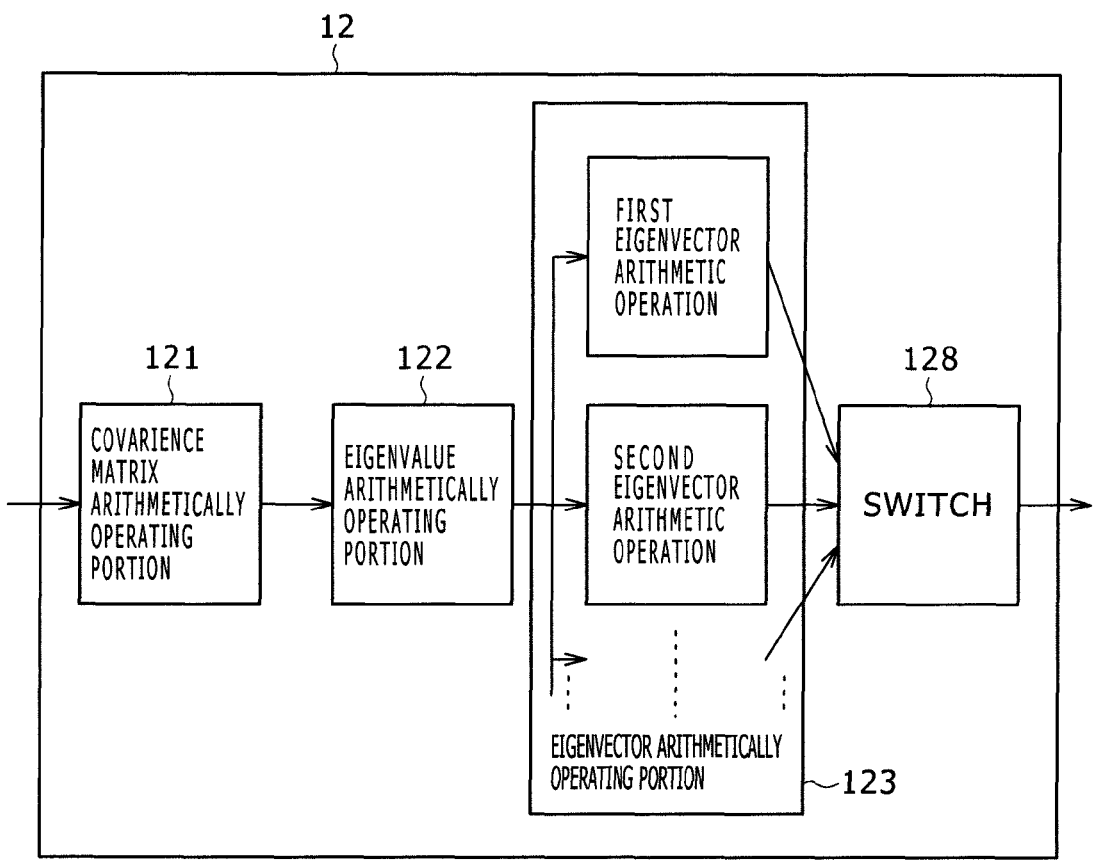
FIG. 6 is a block diagram showing another example of the internal structure of the weighting factor matrix arithmetically operating portion shown in FIG. 1 which is applied to the terminal shown in FIG. 4.
Figure 7:
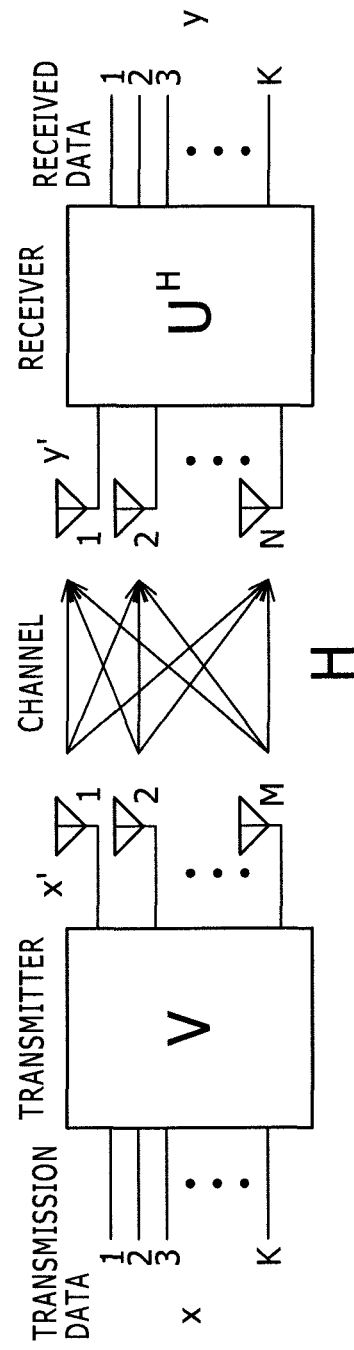
FIG. 7 is a diagram conceptually showing an SVD-MIMO communication system according to the related art.

The weighting factor matrix arithmetically operating portion 12 shown in FIG. 4, for example, has a structure as shown in FIG. 5 or 6.

In the structural example shown in FIG. 5, in the weighting factor matrix arithmetically operating portion 12, the covariance matrix arithmetically operating portion 121 calculates the covariance matrix A from the channel information matrix of the downlink. The eigenvalue arithmetically operating portion 122 obtains the eigenvalues of the covariance matrix A. Also, the eigenvector arithmetically operating portion 123 arithmetically operates the eigenvectors, and outputs the resulting eigenvectors.

A large number of combinations exist in terms of the eigenvectors (this is previously stated). In the structural example shown in FIG. 6, a plurality set of eigenvectors which are obtained by arithmetically operating the eigenvectors $\lambda_1$ and $\lambda_2$ are prepared. Suitable one is selected from among the plurality set of eigenvectors through a switch 128, and is output to the subsequent weighting portion 13. "The matrix having the low possibility that the arithmetic operation error finally occurs", for example, can be given as the selection criteria in accordance with which suitable one is selected from among the plurality set of eigenvectors through the switch 128 (the same as the above).

When the weighting factor matrix arithmetically operating portion 12 shown in FIG. 5 or 6 outputs the weighting factor matrix $V_{dn}$, the subsequent weighting portion 13 executes the weighting processing by complex-multiplexing each of the transmission signal vectors x by the weighting factor matrix $V_{dn}$. Here, each of the transmission signal vectors x is obtained by distributing the transmission data to the transmitting antennas. Subsequently, after each of the transmission signals is weighted with the weighting factor matrix $V_{dn}$, the transmission signal normalizing portion 18 executes the processing for normalizing each of the transmission signals.

When the transmission signal normalizing portion 18 properly executes the normalizing processing, the norm of each of the output transmission vectors is usually held at the constant value. However, the proper operation is not necessarily guaranteed for the processing in the transmission signal normalizing portion 18. The reason for this is because it is possible that the division or the like based on the square-root of sum of squares is contained in the normalizing processing, and thus when such normalizing processing is executed based on the integer arithmetic operation limited in the word length, the input signal becomes beyond the expected limit, so that the arithmetic operation error occurs, and the overflow or the underflow occurs in the middle of the arithmetic operation.

Thus, the detector 15 is provided with a function of detecting occurrence of the following abnormal situations.

(1) The input signal to the transmission signal normalizing portion 18 is beyond the expected limit (too large or too small).

(2) The overflow or the underflow occurs in the middle of the arithmetic operation for normalization by the transmission signal normalizing portion 18.

When the detector 15 detects these situations, the row norm of the output weighting factor matrix is largely different from the expected value. As a result, there is the high possibility that the transmission electric power becomes beyond the upper limit set by the Radio Law control. For this reason, a matrix product obtained by multiplying each of the transmission signal vector x by the predetermined matrix in a matrix product arithmetic operating portion 17 is selected through the switch 16 instead of the arithmetic operation result obtained in the transmission signal normalizing portion 18 in accordance with the detection output from the detector 15. Also, the elements of the resulting matrix product are sent out through the transmitting antennas, respectively. Here, the matrix product arithmetically operating portion 17 previously stores the weighting factor matrix, having the row norm guaranteed therefore, such as the unit matrix, the rotation matrix having the suitable angle, the mirror matrix, the Walsh-Hadamard matrix, or the matrix obtained by combining these two or more matrices with each other in the ROM or the like. In this case, none of the transmission signal vectors x is weighted with the weighting factor matrix having the row norm becoming the unexpectedly large value. As a result, the possibility that the transmission electric power becomes beyond the upper limit set by the Radio Law control becomes very low.

It is noted that in the structural example of the terminal 1 shown in FIG. 4, either the normalized weighting factor matrix may be previously prepared in the matrix product arithmetically operating portion 17, or the normalizing processing may be executed after each of the transmission signals is weighted.

In addition, in the circuit structure as well of the terminal 1 shown in FIG. 4, the weighting factor matrix is previously stored in a ROM (not shown). In this case, it is detected that the problem about the increase in arithmetical operation error, or the overflow or the underflow due to the influence of the limit in the word length is caused. Also, the weighting factor matrix of the default is output from the ROM to the weighting portion 13 in the subsequent stage instead of the arithmetic operation result obtained from the transmission signal normalizing portion 18. As a result, the row norm of the weighting factor matrix can be prevented from unexpectedly fluctuating. Here, the unit matrix, the rotation matrix having the suitable angle, the mirror matrix, the Walsh-Hadamard matrix, the matrix obtained by combining these two or more matrices with each other, or the like, for example, can be used as the weighting factor matrix which is previously stored in the ROM.

The present invention has been described in detail so far while reference is made to the specific embodiment. However, it is obvious that modifications and substitutions of the embodiment concerned can be made by those skilled in the art without departing from the gist of the present invention. That is to say, the present invention has been disclosed merely in the form of an exemplification, and thus the contents of the description of this specification should not be intended to be construed in a limiting sense. In order to determine the gist of the present invention, the appended claims should be taken into consideration.

What is claimed is:

1. A wireless communication system for carrying out a spatial multiplexing communication between a transmitter having a plurality of antennas, and a receiver having a plurality of antennas, the wireless communication system comprising:

channel information matrix acquiring means for acquiring a channel information matrix having transmission functions of the pairs of antennas between the sender side and the receiver side as elements;

weighting factor matrix arithmetically operating means for obtaining a weighting factor matrix based on the channel information matrix thus acquired;

weighting processing means for executing weighting processing based on the weighting factor matrix for transmission signals which are transmitted from the transmitter;

transmission signal normalizing means for executing processing for normalizing each of the transmission signals weighted by the weighting processing means so that each of electric powers of the transmission signals from the respective transmitting antennas becomes a specified value;

matrix product arithmetically operating means for multiplying each of the transmission signals which are transmitted from the transmitter by a predetermined matrix, thereby weighting each of the transmission signals;

detecting means for detecting whether there is presence or absence of an abnormality in the processing executed by the weighting processing means or the normalizing means; and transmitting means for transmitting one of the transmitting signal for which the weighting processing means executes the weighting processing, and the transmission signal obtained by the matrix product arithmetically operating means from the transmitter to the receiver in accordance with the detection result obtained from the detecting means.

2. The wireless communication system according to claim 1, wherein the detecting means detects that an input signal beyond a predetermined limit is input to the transmission signal normalizing means, or that an overflow or an underflow occurs in a middle of the arithmetic operation for the normalization as abnormality.

3. The wireless communication system according to claim 1, wherein the matrix product arithmetically operating means previously prepares a weighting factor matrix having a row norm guaranteed therefore, and multiplies each of the transmission signals which are transmitted from the transmitter by the weighting factor matrix to weight each of the transmission signals.

4. The wireless communication system according to claim 3, wherein the matrix product arithmetically operating means previously prepares a unit matrix, a rotation matrix having a suitable angle, a mirror matrix, a Walsh-Hadamard matrix, or a matrix obtained by combining these two or more matrices with each other.

5. A wireless communication apparatus including a plurality of antennas for carrying out a spatial multiplexing communication with a receiver having a plurality of antennas, the wireless communication apparatus comprising:

weighting factor matrix arithmetically operating means for obtaining a weighting factor matrix based on a channel information matrix having transmission functions of the pairs of antennas between the sender side and the receiver side as elements;

weighting processing means for executing weighting processing, based on the weighting factor matrix, for transmission signals which are transmitted through the antennas, respectively;

transmission signal normalizing means for executing processing for normalizing each of the transmission signals weighted by the weighting processing means so that each of electric powers of the transmission signals from the respective transmitting antennas becomes a specified value;

matrix product arithmetically operating means for multiplying each of the transmission signals which are transmitted through the antennas, respectively, by a predetermined matrix, thereby weighting each of the transmission signals concerned;

detecting means for detecting whether there is presence or absence of an abnormality in the processing executed by the weighting processing means or the normalizing section; and transmitting means for transmitting one of the transmitting signal for which the weighting processing means executes the weighting processing, and the transmission signal obtained by the matrix product arithmetically operating means from the transmitter to the receiver in accordance with the detection result obtained from the detecting means.

6. The wireless communication apparatus according to claim 5, wherein the detecting means detects that an input signal beyond a predetermined limit is input to the transmission signal normalizing means, or that an overflow or an underflow occurs in a middle of the arithmetic operation for the normalization as abnormality.

7. The wireless communication apparatus according to claim 5, wherein the matrix product arithmetically operating means previously prepares a weighting factor matrix having a row norm guaranteed therefore, and multiplies each of the transmission signals which are transmitted from the transmitter by the weighting factor matrix to weight each of the transmission signals.

8. The wireless communication apparatus according to claim 7, wherein the matrix product arithmetically operating means previously prepares a unit matrix, a rotation matrix having a suitable angle, a mirror matrix, a Walsh-Hadamard matrix, or a matrix obtained by combining these two or more matrices with each other.

9. A wireless communication method of carrying out a spatial multiplexing communication with a receiver having a plurality of antennas by using a plurality of antennas, the wireless communication method comprising the steps of:

arithmetically operating a weighting factor matrix based on a channel information matrix having transmission functions of the pairs of antennas between the sender side and the receiver side as elements;

executing weighting processing, based on the weighting factor matrix, for each of transmission signals which are transmitted through the antennas, respectively;

executing processing for normalizing each of the transmission signals weighted in the weighting processing so that each of electric powers of the transmission signals which are transmitted through the transmission antennas, respectively, becomes a specified value;

multiplexing each of the transmission signals which are transmitted through the antennas, respectively, by a predetermined matrix, thereby weighting each of the transmission signals;

detecting whether there is presence or absence of an abnormality in the processing executed in the weighting processing step or in the normalizing step; and transmitting one of the transmission signal for which the weighting processing is executed in the weighting processing step, and the transmission signal obtained in the matrix product arithmetically operating step in accordance with a detection result obtained in the detecting step.

10. The wireless communication method according to claim 9, wherein in the detecting step, it is detected as an abnormality in the processing that an input signal beyond a predetermined limit is input to the transmission signal normalizing step, or that an overflow or an underflow occurs in a middle of the arithmetic operation for the normalization.

11. The wireless communication method according to claim 9, wherein in the matrix product arithmetically operating step, each of the transmission signals which are transmitted through the antennas, respectively, is weighted with a weighting factor matrix having a row norm guaranteed therefore.

12. The wireless communication method according to claim 11, wherein in the matrix product arithmetically operating step, a unit matrix, a rotation matrix having a suitable angle, a mirror matrix, a Walsh-Hadamard matrix, or a matrix obtained by combining these two or more matrices with each other is used.

13. A wireless communication system for carrying out a spatial multiplexing communication between a transmitter having a plurality of antennas, and a receiver having a plurality of antennas, the wireless communication system comprising:

a channel information matrix acquiring section configured to acquire a channel information matrix having transmission functions of the pairs of antennas between the sender side and the receiver side as elements;

a weighting factor matrix arithmetically operating section configured to obtain a weighting factor matrix based on the channel information matrix thus acquired;

a weighting processing section configured to execute weighting processing based on the weighting factor matrix for transmission signals which are transmitted from the transmitter;

a transmission signal normalizing section configured to execute processing for normalizing each of the transmission signals weighted by the weighting processing section so that each of electric powers of the transmission signals from the respective transmitting antennas becomes a specified value;

a matrix product arithmetically operating section configured to multiply each of the transmission signals which are transmitted from the transmitter by a predetermined matrix, thereby weighting each of the transmission signals;

a detecting section configured to detect whether there is presence or absence of an abnormality in the processing executed by the weighting processing section or the normalizing section; and a transmitting section configured to transmit one of the transmitting signal for which the weighting processing section executes the weighting processing, and the transmission signal obtained by the matrix product arithmetically operating section from the transmitter to the receiver in accordance with the detection result obtained from the detecting section.

14. A wireless communication apparatus including a plurality of antennas for carrying out a spatial multiplexing communication with a receiver having a plurality of antennas, the wireless communication apparatus comprising:

a weighting factor matrix arithmetically operating section configured to obtain a weighting factor matrix based on a channel information matrix having transmission functions of the pairs of antennas between the sender side and the receiver side as elements;

a weighting processing section configured to execute weighting processing, based on the weighting factor matrix, for transmission signals which are transmitted through the antennas, respectively;

a transmission signal normalizing section configured to executing processing for normalizing each of the transmission signals weighted by the weighting processing section so that each of electric powers of the transmission signals from the respective transmitting antennas becomes a specified value;

a matrix product arithmetically operating section configured to multiply each of the transmission signals which are transmitted through the antennas, respectively, by a predetermined matrix, thereby weighting each of the transmission signals concerned;

a detecting section configured to detect whether there is presence or absence of an abnormality in the processing executed by the weighting processing section or the normalizing section; and a transmitting section configured to transmit one of the transmitting signal for which the weighting processing section executes the weighting processing, and the transmission signal obtained by the matrix product arithmetically operating section from the transmitter to the receiver in accordance with the detection result obtained from the detecting section.

* * * * *